(12) United States Patent
Koslowski et al.

(10) Patent No.: US 7,210,878 B2
(45) Date of Patent: May 1, 2007

(54) FEED ADAPTATION CORE DRILL

(75) Inventors: Oliver Koslowski, Utting am Ammersee (DE); Konrad Lieb, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 456 days.

(21) Appl. No.: 10/768,772

(22) Filed: Jan. 30, 2004

(65) Prior Publication Data

US 2004/0253064 A1  Dec. 16, 2004

(30) Foreign Application Priority Data

Feb. 1, 2003  (DE) .............................. 103 04 405

(51) Int. Cl.
*B23B 35/00* (2006.01)
(52) U.S. Cl. .................. 408/1 R; 408/10; 408/12; 173/176
(58) Field of Classification Search ............... 408/1 R, 408/9, 10, 11, 12; 173/2, 4, 176; 340/648, 340/664, 680; 318/434; 361/31
See application file for complete search history.

(56) References Cited

U.S. PATENT DOCUMENTS

| | | | |
|---|---|---|---|
| 3,259,023 A | * | 7/1966 | Rieger et al. ............... 409/187 |
| 3,418,549 A | * | 12/1968 | Emerson et al. ............... 318/39 |
| 3,898,880 A | | 8/1975 | Kelseaux et al. |
| 4,157,231 A | * | 6/1979 | Phillips ....................... 408/1 R |
| 4,346,444 A | * | 8/1982 | Schneider et al. .......... 700/173 |
| 4,604,006 A | * | 8/1986 | Shoji et al. .................... 408/76 |
| 4,618,805 A | | 10/1986 | Hornung |
| 4,831,364 A | * | 5/1989 | Shinohara et al. .......... 340/680 |
| 5,042,309 A | * | 8/1991 | Kitamura ................. 73/862.49 |
| 5,216,917 A | | 6/1993 | Detournay |
| 5,558,476 A | * | 9/1996 | Uchida et al. ............... 408/1 R |
| 6,029,754 A | | 2/2000 | Kattentidt et al. |

FOREIGN PATENT DOCUMENTS

| | | |
|---|---|---|
| DE | 198 07 899 A | 9/1999 |
| EP | 339659 A2 * | 11/1989 |
| GB | 2179525 A | 3/1987 |

OTHER PUBLICATIONS

European Search Report of EP 04 10 0371, dated May 11, 2004.

* cited by examiner

*Primary Examiner*—Daniel W. Howell
(74) *Attorney, Agent, or Firm*—Abelman, Frayne & Schwab

(57) ABSTRACT

A process for controlling and a core drilling machine (1) having an electrical motor (2) for rotational drive of a core drill bit (3) having cutting edges (5) oriented axial to a work piece (4), a feeding means (6) for generating the feed of the core drill bit (3) against the work piece (4) and having a controller (7) for controlling, relative to a first one-to-one control parameter, detected by a sensor (8, 8') for electrical power consumption (P) or torque (M). A force sensor (9, 9') is connected to the controller (7) for detecting the contact pressing force ($F_N$) of the core drill bit (3) as the second control parameter.

16 Claims, 2 Drawing Sheets

FEED ADAPTATION CORE DRILL

BACKGROUND OF THE INVENTION

The invention relates to a feed-controlled core drill, in particular a pedestal-guided diamond core drill for reinforced concrete, and an associated control method.

When core drilling rock, ultra hard cutting edges or diamonds of the drill bit penetrated slightly into the substrate and carry it away. The high torque and feed pressures required for core drilling rock are usually applied against a machine pedestal, which is solidly connected with the substrate. If the control of the feed is effected manually by the operator using a lever wheel, a substrate-specific optimum penetration depth of the blades is not possible, by which early wear of the cutting edges results along with reduced drilling performance.

According to DE 19807899, an adaptive feed control for a pedestal-guided diamond core drilling machine is disclosed, which controls the feed using a PID controller depending on the current consumption of the electrical motor or a torque relative thereto. As a consequence of this type of power-based control, there is only one maximum torque available at a constant speed pre-defined by the gear reduction ratio. Changes in the substrate such as encountering reinforcement leads to non-optimum torque/speed-pairings.

In addition, as disclosed in U.S. Pat. No. 4,618,805, a drill machine has an electrical motor with a motor control, which can be pre-set to the motor characteristic curve of maximum power for different working points independent of each other and can be switched automatically between the working points.

SUMMARY OF THE INVENTION

The object of the invention is to provide an feed-controlled core drilling machine and an associated control process, which reacts to changes in the substrate without interrupting the drilling operation by optimum torque/speed-pairs.

This object is achieved, in accordance with the invention, by a core drilling machine having an electrical motor for providing rotational drive of a core drill bit with cutting edges oriented axially to a work piece, a feeding means for generating the feed of the core drill bit against the work piece and a controller for controlling relative to a first control parameter detected by a sensor for one-to-one the electrical consumption or torque, whereby a force sensor for detection of the contact pressing force of the core drill bit is connected with the controller as a second control parameter.

With the additional detection of the contact pressing force, advantageously detected by the current consumption of the feed motor, as the second control parameter, a substrate-specific frictional coefficient is determined with the one-to-one first control parameter or the power consumption or torque, and this coefficient is used as the control parameter for controlling the feed of the core drill bit, which directly describes the microphysical abrasion of the cutting edges.

It can be shown that the substrate-specific frictional coefficient can be generally calculated from a measured power consumption or the torque produced and a normal force.

Advantageously, the force sensor is configured as a piezo force sensor and arranged in an axial bearing zone of the drive spindle, whereby the normal force is directly measurable in the core drilling machine.

Alternatively, the force sensor is configured as a force sensor (for example a current sensor or torque sensor) of the feeding means, i.e. of the feed motor, whereby the normal force is directly measurable in the feeding means.

Advantageously, the controller is configured as a microcontroller, whereby the frictional coefficient utilized as the control parameter can be calculated numerically and accordingly free of drift.

Advantageously, the controller is connected to an entry means (for example, a keyboard or a selection switch) for the radius of the drill bit; further advantageously, with a transponder, which queries an identification means on the drill bit, whereby the control is effected specifically for the actual drill bit diameter.

Advantageously, in the controller different torques or speeds are associated with at least two different frictional coefficients, whereby the feed of the core drill bit is controlled as a factor of the detected substrate and matched to the respective substrate.

Advantageously, the electrical motor is controllable connected to a motor control connected to the controller in the feeding means, which can electronically switch the at least two different working points of the electrical motor, which lie on the motor characteristic curve of maximum power, whereby the electrical motor with the motor control provides an electronic gearing, which is controllable by the controller. Frequency-inverting fed asynchronous machines with large field weakening range are particularly suited as electrical motors.

Advantageously, different torques or speeds in the controller are associated with at least two different frictional coefficients, whereby the working point of the core drill bit is controlled as a factor of the detected substrate and matched to the respective substrate.

Advantageously, the controller in the feeding means is connected by a bi-directional optical interface with the motor control for transmission of the sensor measurement values and the optimum torque/speed-pairings of the controller, whereby a galvanic separation of the feeding means mechanically connected to the drill pedestal from the usually water-cooled electrical motor is realized.

In the associated process for controlling a core drilling machine with an electrical motor for rotational driving of a core drill bit, in a first step, a first control parameter dependent on the power of the electrical motor is detected using a sensor; this control parameter is evaluated by a controller in a second step and in a third step a feeding means for the core drill bit is controlled by the controller. In the first step, a second control parameter that is dependent on the contact pressing force is detected using a force sensor, in a second step a control parameter one-to-one with the frictional coefficient is determined by the controller from the first and the second control parameters and this data is used for controlling the feeding means, in a third step.

Advantageously, in the third step, motor control of the electrical motor using the control parameter is regulated relative to at least two different working points, which lie on the maximum power of the motor characteristic curve.

BRIEF DESCRIPTION OF THE DRAWINGS

The invention will be more completely described with reference to the drawings, wherein.

DETAILED DESCRIPTION OF THE INVENTION

Figure 1:
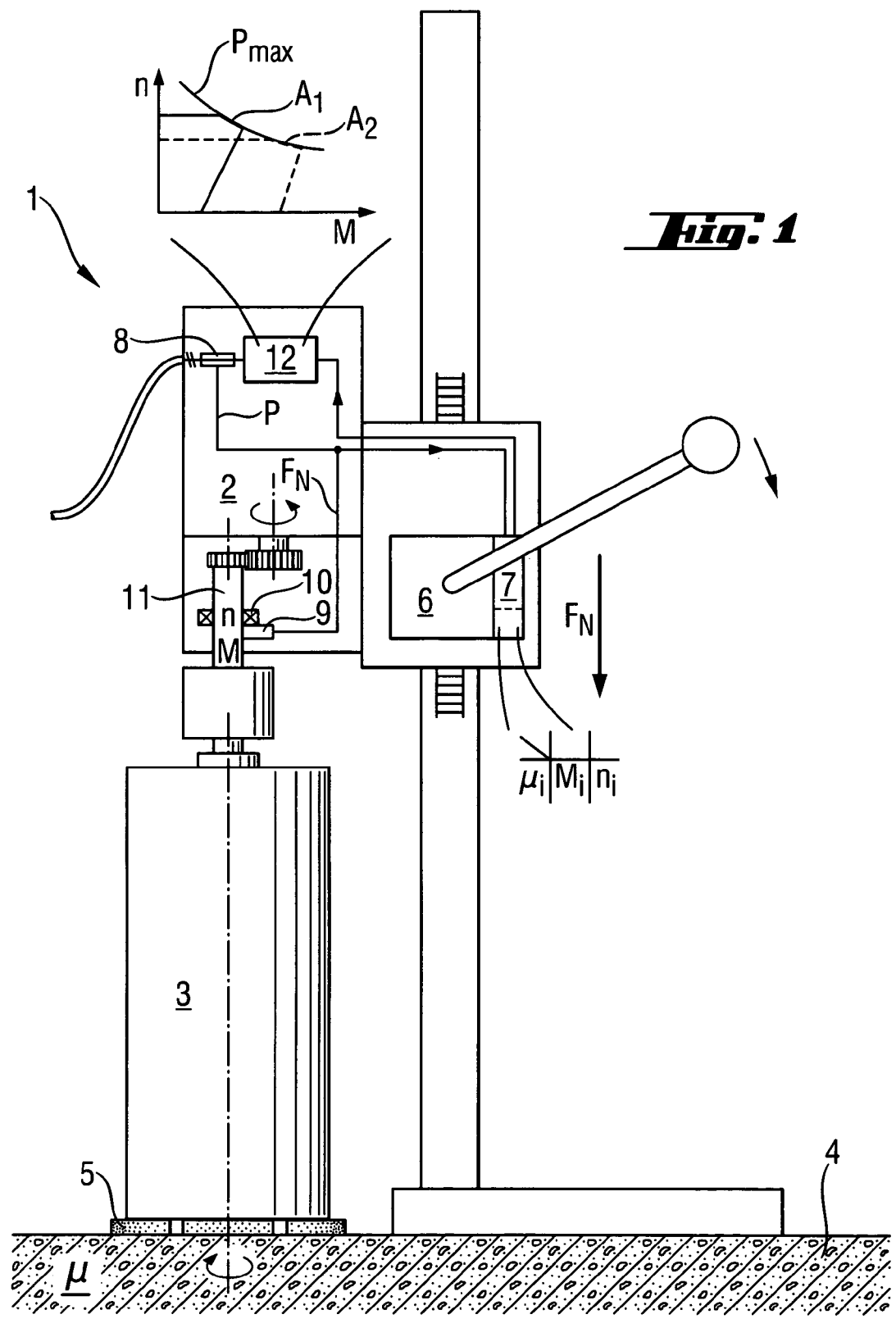
FIG. 1 shows a side view of a core drilling machine with a core drill bit according to the invention.
Figure 2:
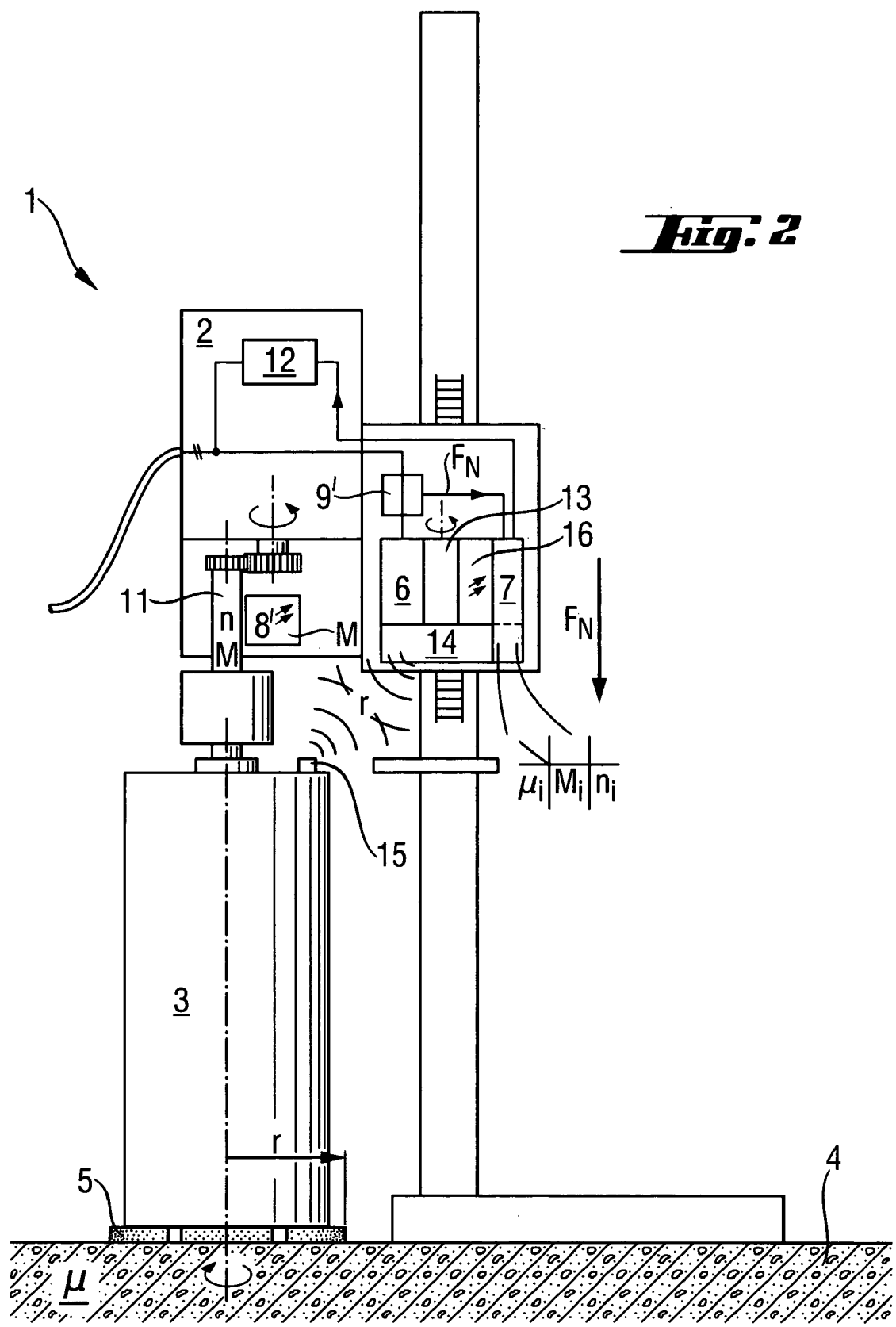
FIG. 2 shows a variant of the embodiment shown in FIG. 1.

According to FIG. 1, a core drilling machine 1 has an electrical motor 2 for rotationally driving a core drill bit 3 with ultrahard cutting edges 5 that are oriented axially to a work piece 4 and a feeding means 6 having a controller 7 for controlling the feed of the core drill bit 3 against the work piece 4. The control is effected depending on a control parameter one-to-one with the substrate-specific frictional coefficient μ, which is determined by the controller 7 from an electrical power P detected using a sensor 8 in the current path of the electrical motor 2 and from a contact pressing force $F_N$ of the core drill bit detected using a force sensor 9. $\mu = P/(2\pi n\ r\ F_n) = M/(r\ F_N)$, with μ: frictional coefficient: P: power consumption; M: torque; $F_N$: normal force; r: radius of the drill bit. The force sensor 9 is configured as a piezo force sensor and arranged in a thrust bearing zone 10 of a drive spindle 11 of the core drilling machine 1. In the controller 7 configured as a microcontroller, respectively different torques $M_I$ or speeds $n_I$ are tabularly assigned to a plurality of different frictional coefficients $\mu_I$. The electrical motor 2 configured as a frequency-inverter supplied asynchronous machine with large field weakening range is connected to a motor controller that is controllably connected to the controller 7 in the feeding means 6, which can electronically switch a plurality of different working points $A_I$ of the electrical motor 2, which lie on the motor characteristic curve of maximum power $P_{max}$. In the controller, a plurality of different frictional coefficients $\mu_I$ are tabularly assigned to respectively different torque/speed-pairings $[M_i/n_i]$. According to FIG. 2, in a variant embodiment, the force sensor 9' is configured as the force sensor of the feeding means 6 and arranged in the current path of an feed motor 13. The controller 7 is connected to an input means 14 in the form of a transponder, which queries an identification means 15 arranged on the core drill bit 3, using the radius r of the core drill bit. The controller 7 is connected by a bidirectional optical interface 16 with a sensor 8' measuring the torque M of the drive spindle 11 and to the motor controller 12 for transmission of the optimum torque/speed-pairings $[M_i/n_i]$.

What is claimed is:

1. A core drilling machine with an electrical motor (2) for rotational drive of a core drilling bit (3) having cutting edges oriented axial to a work piece (4), a feeding means (6) for generation of the feed of the core drill bit (3) against the work piece (4) and a controller (7) for controlling, relative to a first one-to-one control parameter, detected by a sensor (8, 8') for one of electrical power consumption (P) and torque (M), wherein a force sensor (9, 9') is connected to the controller (7) for detecting a contact pressing force ($F_N$) of the core drill bit (3) as the second control parameter;

wherein the force sensor (9') is a power sensor of the feeding means (6);

wherein the controller (7) is a microcontroller; and wherein the controller (7) is connected to an input means (14) for the radius (r) of the drill bit (3), with a transponder that queries an identification means (15) on the core drill bit (3).

2. The core drilling machine of claim 1, wherein the force sensor (9) is a piezo force sensor arranged in a thrust bearing zone (10) of a drive spindle (11).

3. A core drilling machine with an electrical motor (2) for rotational drive of a core drilling bit (3) having cutting edges oriented axial to a work piece (4), a feeding means (6) for generation of the feed of the core drill bit (3) against the work piece (4) and a controller (7) for controlling, relative to a first one-to-one control parameter, detected by a sensor (8, 8') for one of electrical power consumption (P) and torque (M), wherein a force sensor (9, 9') is connected to the controller (7) for detecting a contact pressing force ($F_N$) of the core drill bit (3) as the second control parameter;

wherein respectively different torques/speed-pairings $([M_i/n_i])$ are tabularly arranged in the controller (7) relative to at least two different substrate-specific frictional coefficients ($\mu_i$) that are assigned to the different torques $M_i$ and speeds $n_i$ in the controller (7).

4. The core drilling machine of claim 3, wherein the force sensor (9) is a piezo force sensor arranged in a thrust bearing zone (10) of a drive spindle (11).

5. The core drilling machine of claim 3, wherein one of respectively different torques $M_I$ and speeds $n_I$ are tabularly arranged in the controller (7) relative to at least two different substrate-specific frictional coefficients ($\mu_I$) in the controller (7).

6. The core drilling machine of claim 1, wherein one of respectively different torques $M_I$ and speeds $n_I$ are tabularly arranged in the controller (7) relative to at least two different substrate-specific frictional coefficients ($\mu_I$) in the controller (7).

7. The core drilling machine of claim 1, wherein the electrical motor (2) is connected to a motor controller (12) controllably connected to the controller (7) that can electrically switch different working points ($A_i$) of the electrical motor that lies on a motor characteristic curve of maximum power ($P_{max}$) as tabularly assigned torque/speed-pairings in the controller (7) relative to at least two different substrate-specific frictional coefficients ($\mu_i$) that are assigned to the different torques $M_i$ and speeds $n_i$ in the controller (7).

8. The core drilling machine of claim 1, wherein respectively different torques/speed-pairings $([M_i/n_i])$ are tabularly arranged in the controller (7) relative to at least two different substrate-specific frictional coefficients ($\mu_i$) in the controller (7) that are assigned to the different torques $M_i$ and speeds $n_i$ in the controller (7).

9. The core drilling machine of claim 7, wherein the controller (7) connected to the feeding means (6) by a bi-directional optical interface (16) is connected to the motor controller (12).

10. A process for controlling a core drilling machine (1) having an electrical motor (2) for rotational drive of a core drill bit (3), with a force sensor (9') being a power sensor of a feeding means (6), with a controller (7) being a microcontroller connected to an input means (14) for a radius (r) of the core drill bit (3), with a transponder that queries an identification means (15) on the core drill bit (3), wherein, in a first step, a first control parameter that is dependent on the electrical motor (2) is detected by a sensor (8, 8'); in a second step, the first control parameter is evaluated by the controller (7), and in a third step, a feeding means (6) for the core drill bit (3) is controlled by the controller (7), wherein in the first step, a second control parameter that is dependent on the a contact pressing force ($F_N$) is detected using the force sensor (9, 9'), in the second step, a one-to-one control parameter relative to a first substrate-specific frictional coefficient (μ) in the controller (7) is determined from the first and the second control parameter and in the third step, the one-to-one control parameter is used for controlling the feeding means (6).

11. The process according of claim 10, wherein, in the third step, a motor control (12) of the electrical motor (2) is controlled using the first control parameter relative to at least two different working points ($A_i$) that lie on the motor characteristic curve of maximum power ($P_{max}$) as tabularly assigned torque/speed-pairings in the controller (7) relative to at least two different substrate-specific frictional coefficients ($\mu_i$) that are assigned to the different torques $M_i$ and speeds $n_i$ in the controller (7).

12. A core drilling machine with an electrical motor (2) for rotational drive of a core drilling bit (3) having cutting edges oriented axial to a work piece (4), a feeding means (6) for generation of the feed of the core drill bit (3) against the work piece (4) and a controller (7) for controlling, relative to a first one-to-one control parameter, detected by a sensor (8, 8') for one of electrical power consumption (P) and torque (M), wherein a force sensor (9, 9') is connected to the controller (7) for detecting a contact pressing force ($F_N$) of the core drill bit (3) as the second control parameter;

wherein the electrical motor (2) is connected to a motor controller (12) controllably connected to the controller (7) that can electrically switch different working points ($A_i$) of the electrical motor that lies on a motor characteristic curve of maximum power ($P_{max}$) as tabularly assigned torque/speed-pairings in the controller (7) relative to at least two different substrate-specific frictional coefficients ($\mu_i$) that are assigned to the different torques $M_i$ and speeds $n_i$ in the controller (7).

13. The core drilling machine of claim 12, wherein the force sensor (9) is a piezo force sensor arranged in a thrust bearing zone (10) of a drive spindle (11).

14. The core drilling machine of claim 12, wherein one of respectively different torques $M_i$ and speeds $n_I$ are tabularly arranged in the controller (7) relative to at least two different substrate-specific frictional coefficients ($\mu_i$) in the controller (7).

15. The core drilling machine of claim 12, wherein the controller (7) connected in the feeding means (6) by a bi-directional optical interface (16) is connected to the motor controller (12).

16. A process for controlling a core drilling machine (1) having an electrical motor (2) for rotational drive of a core drill bit (3), wherein, in a first step, a first control parameter that is dependent on the electrical motor (2) is detected by a sensor (8, 8'); in a second step, the control parameter is evaluated by a controller (7), and in a third step, a feeding means (6) for the core drill bit (3) is controlled by controller (7), wherein in the first step, a second control parameter that is dependent on a contact pressing force ($F_N$) is detected using a force sensor (9, 9'), in the second step, a one-to-one control parameter relative to a first substrate-specific frictional coefficient ($\mu$) in the controller (7) is determined from the first and the second control parameter and in the third step, the one-to-one control parameter is used for controlling the feeding means (6);

wherein, in the third step, a motor control (12) of the electrical motor (2) is controlled using the control parameter relative to at least two different working points ($A_i$) that lie on a motor characteristic curve of maximum power ($P_{max}$) as tabularly assigned torque/speed-pairings in the controller (7) relative to at least two different substrate-specific frictional coefficients ($\mu_i$) in the controller (7) that are assigned the different torques $M_i$ and speeds $n_i$ in the controller (7).

* * * * *